United States Patent [19]
Campbell et al.

[11] Patent Number: 5,944,168
[45] Date of Patent: Aug. 31, 1999

[54] CRESCENT SHAPED SUPPORT COVER

[75] Inventors: Colin D. Campbell, West Jordan; Venny J. Williams, West Valley City, both of Utah

[73] Assignee: Cambelt International Corporation, Salt Lake City, Utah

[21] Appl. No.: 09/162,677

[22] Filed: Sep. 28, 1998

[51] Int. Cl.⁶ .................................................. B65G 65/38
[52] U.S. Cl. ........................ 198/519; 198/860.3; 414/326
[58] Field of Search ................... 198/519, 658, 198/661, 672, 673, 677, 860.1, 860.3; 414/133, 291, 310, 326, 327

[56] References Cited

U.S. PATENT DOCUMENTS

| | | |
|---|---|---|
| 3,282,446 | 11/1966 | Laidig . |
| 3,319,809 | 5/1967 | Prentice . |
| 3,356,235 | 12/1967 | Laidig . |
| 3,456,818 | 7/1969 | Massey . |
| 3,547,283 | 12/1970 | Beebe et al. . |
| 3,674,094 | 7/1972 | Kuntz . |
| 4,312,441 | 1/1982 | Frisk ........................................ 198/519 |
| 4,333,560 | 6/1982 | Frisk ........................................ 198/519 |
| 4,701,093 | 10/1987 | Meyer ..................................... 414/312 |
| 5,167,318 | 12/1992 | Siemens ............................. 198/550.01 |
| 5,180,272 | 1/1993 | Campbell ............................. 198/519 X |
| 5,267,672 | 12/1993 | Jacobsen et al. ................. 198/860.3 X |
| 5,449,263 | 9/1995 | Campbell et al. ....................... 414/320 |
| 5,511,925 | 4/1996 | Muth ........................................ 414/310 |
| 5,769,590 | 6/1998 | Weikel .................................... 414/321 |

FOREIGN PATENT DOCUMENTS

| | | | |
|---|---|---|---|
| 55-2556 | 1/1980 | Japan ................................... 198/860.3 |
| 975516 | 11/1982 | U.S.S.R. ............................... 198/860.3 |

*Primary Examiner*—Janice L. Krizek
*Attorney, Agent, or Firm*—Thorpe, North & Western

[57] ABSTRACT

A crescent shaped support cover for an elongate material reclamation mechanism in a granular or powdered material storage enclosure, the support cover comprising: a first elongate tube having a longitudinal opening formed in its side along the full length of the tube; a second elongate tube having a longitudinal opening formed in its side along the full length of the tube, the longitudinal opening having a width that is approximately equal to the width of the longitudinal opening in the first tube, the second tube being larger in cross-section than the first tube, and the first tube being longitudinally disposed within the second tube such that the longitudinal openings of the first tube and the second tube are aligned, the first tube being continuously attached to the second tube along the edges of the longitudinal openings, forming an elongate structure defining a partially open elongate tubular space within the first tube suitable for partially enclosing an elongate auger, and defining an enclosed cross-sectionally substantially crescent shaped space between the outside surface of the first tube and the inside surface of the second tube, the elongate structure configured to function as both an auger cover and a load-bearing structural support member for an elongate material reclamation mechanism.

17 Claims, 3 Drawing Sheets

CRESCENT SHAPED SUPPORT COVER

BACKGROUND OF THE INVENTION

1. Field of the Invention

This invention relates to material storage and transfer facilities for bulk granular and powdered material storage. More particularly, the present invention relates to an improved crescent shaped auger cover that functions as both the auger cover and the structural support for an elongate material reclamation mechanism.

2. State of the Art

Many granular and powdered bulk materials require a controlled storage environment and unique handling profile during loading and unloading in storage areas. For example, grain, portland cement, fly ash, dry fuels, and other such commodities must be totally enclosed and protected from the elements when stored. However, the total enclosure of bulk materials limits convenient access for retrieval, making quick and complete reclamation difficult. Although movable roofing permits direct use of scoop shovels and buckets to raise the material to nearby trucks or railcars, such facilities and methods are labor intensive and require a significant capital investment for equipment and special construction of buildings.

There are many well known methods for the storage and retrieval of such materials. One method that has gained widespread popularity in recent years is the use of dome structures for storage. Free-standing dome structures, such as disclosed in U.S. Pat. No. 3,456,818, are extremely strong and space efficient, requiring a minimum of materials to obtain a large volume of enclosed space. They are also relatively inexpensive to construct as, for example, by thin-shell concrete balloon forming methods.

Additionally, reclamation of materials from an enclosed storage location may present significant challenges due to the nature of the material. For example, dry portland cement settles and compresses when stored, creating a compact and dense mass that can be difficult to remove. If one attempts to remove this material by a front-end loader through lateral doors at the base of a storage enclosure, the compressed cement may not readily collapse with removal of under-supporting material, allowing the creation of a sizable cavern within the material. This cavern could collapse suddenly, with disastrous results.

To solve these sorts of problems, automated reclamation devices for use within domed material storage structures have been developed. For example, U.S. Pat. No. 5,449,263 and prior patents disclose a free-standing dome storage structure having a mechanical reclaimer installed therein. Such a system is shown in FIG. 1. These reclaimers typically comprise a rotating vertical column 16 in the center of the dome storage structure 10, with one or more elongate material transfer mechanisms 40 and 41 attached thereto. These transfer mechanisms are necessarily shorter than the radius of the dome so as not to contact the inside surface of it. The transfer mechanisms typically employ auger devices 17 and 18 to move material, and are usually attached to a bridge type structure that is attached to the bottom of the column via a hinge 42 at their proximal end, and connected at their distal end to the top of the column via a cable 61 and winch device. The column 16 is rotated by a drive motor 60 located at the top of the column, with auger drive motors 62 positioned at the distal ends of the transfer structures. The cable 61 and winch mechanism allows the transfer structures to be selectively raised or lowered to contact the surface of the stored material.

The domed storage structure is typically filled via a conveyor 12 or similar transport mechanism that drops material into the dome through an opening 13 in the top center. Upon filling, the center column and transfer mechanism are designed to be buried in the stored material with the elongate transfer bridge retracted to an upright position as shown. When the material is to be reclaimed, a sufficient quantity of material is removed from the center of the dome by some means that allows pure gravity flow of the material into an outlet opening 19, such as by means of air jets upwardly directed from the bottom center of the dome. Then the transfer bridge structures 40 and 41 are lowered to the material surface, and as the column slowly rotates about its central axis 22, the augers sweep and drag the stored material toward the bottom center of the interior of the dome in a gradually declining conical motion, where, at the base of the column, some means is employed to gather the material and transport it under the floor of the dome.

The transfer bridge structures currently known and depicted in FIG. 1 present several drawbacks that have not been solved in the industry. First, the open truss design provides many flat surfaces upon which granular or powdered material may settle when the storage structure is filled. As the material settles, a significant load which should be borne by the floor of the structure is instead imposed upon the transfer structure, and thence upon the center column and its foundation. Such loads increase the size, complexity, and cost of construction of the center column and related structural elements. Second, conventional transfer structures expose a large portion of the auger blades, which, when in a relatively upright position, also provide a large surface on which material may settle and impose loads on the center column. Third, the open truss design is bulky and cumbersome. With the configuration shown in FIG. 1, it is not possible to retract the transfer bridge or bridges to a fully upright position because of interfering structure. It would be desirable in the industry to have a granular or powdered material reclamation mechanism for a domed reclamation enclosure that more completely enshrouds the auger blades and provides a more smooth exterior surface so as to reduce the vertical loads imposed on the center column, and which also has a smaller structural cross section so as to weigh less and occupy less space inside the enclosure.

OBJECTS AND SUMMARY OF THE INVENTION

It is therefore an object of the present invention to provide a granular material reclamation transfer structure that is relatively smooth and provides less opportunity for settling material to impose loads upon it.

It is another object of this invention to provide a cover for an auger for a granular material reclamation transfer structure that covers a larger portion of the auger blades.

It is another object of this invention to provide a granular material reclamation transfer structure that is relatively compact in cross-section such that it may be retracted to a more nearly upright position relative to the central column of a granular material storage structure.

It is yet another object of this invention to provide a cover for an auger for a granular material reclamation transfer structure that also serves as the structural support for the elongate transfer structure.

The above and other objects are realized in an apparatus comprising a crescent shaped support cover for an elongate material reclamation mechanism in a granular or powdered material storage enclosure configured to function as both an auger cover and a load-bearing structural support member for the elongate material reclamation mechanism. The support cover comprises a first elongate tube having a longitudinal opening formed in its side along the full length of the tube, and a second elongate tube also having a longitudinal opening formed in its side along the full length of the second tube, the longitudinal opening having a width that is approximately equal to the width of the longitudinal opening in the first tube, the second tube being larger in cross-section than the first tube. The first tube is longitudinally disposed within said second tube such that the longitudinal openings of the first tube and the second tube are aligned, the first tube being continuously attached to the second tube along the edges of the longitudinal openings, forming an elongate structure defining a partially open elongate tubular space within the first tube suitable for partially enclosing an elongate auger, and defining a fully enclosed cross-sectionally substantially crescent shaped space between the outside surface of the first tube and the inside surface of the second tube.

In an illustrative embodiment, the first and second tubes are made of steel and are welded together along the edges of the longitudinal openings, and further comprise transverse stiffeners located within the crescent shaped space between the outside surface of the first tube and the inside surface of the second tube. The support cover and auger mechanism are preferably hingedly connected to a rotatable vertical support column centrally located in a domed granular or powdered material storage structure, and are configured to be selectively declined to contact the surface of the stored material with the exposed portion of the auger blades. The material reclaimer operates in a gradually declining, rotational path when the column is rotated about its vertical axis and the auger mechanism is engaged, so as to sweep and drag successive conical layers of the granular or powdered material to a receptor located at the base of the column.

Other objects and features of the present invention will be apparent to those skilled in the art, based on the following description, taken in combination with the accompanying drawings.

DETAILED DESCRIPTION OF THE PREFERRED EMBODIMENT

Figure 1:
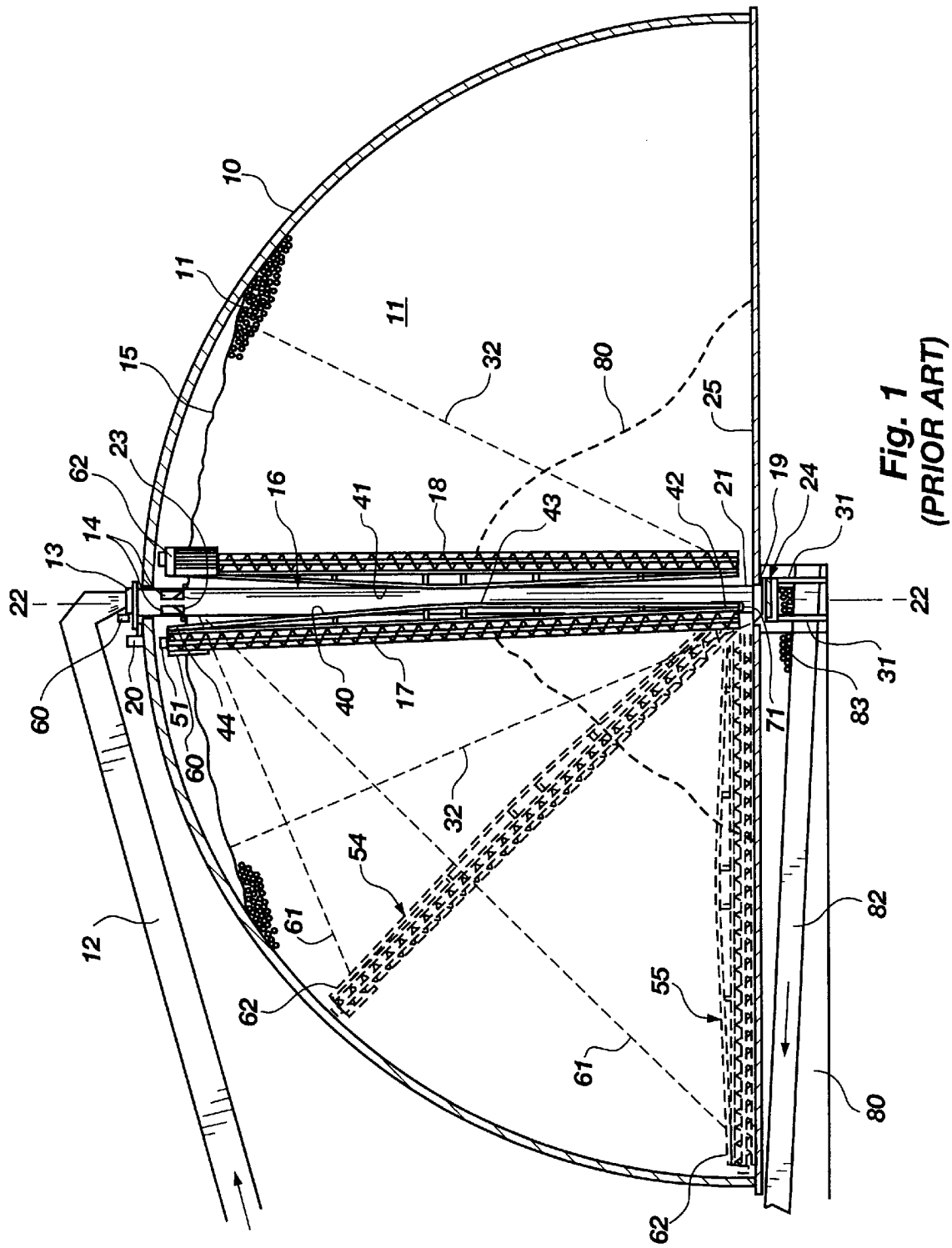
FIG. 1 provides a medial cross section of a prior art hemispherical dome storage structure showing a typical transfer bridge structure.
Figure 3:
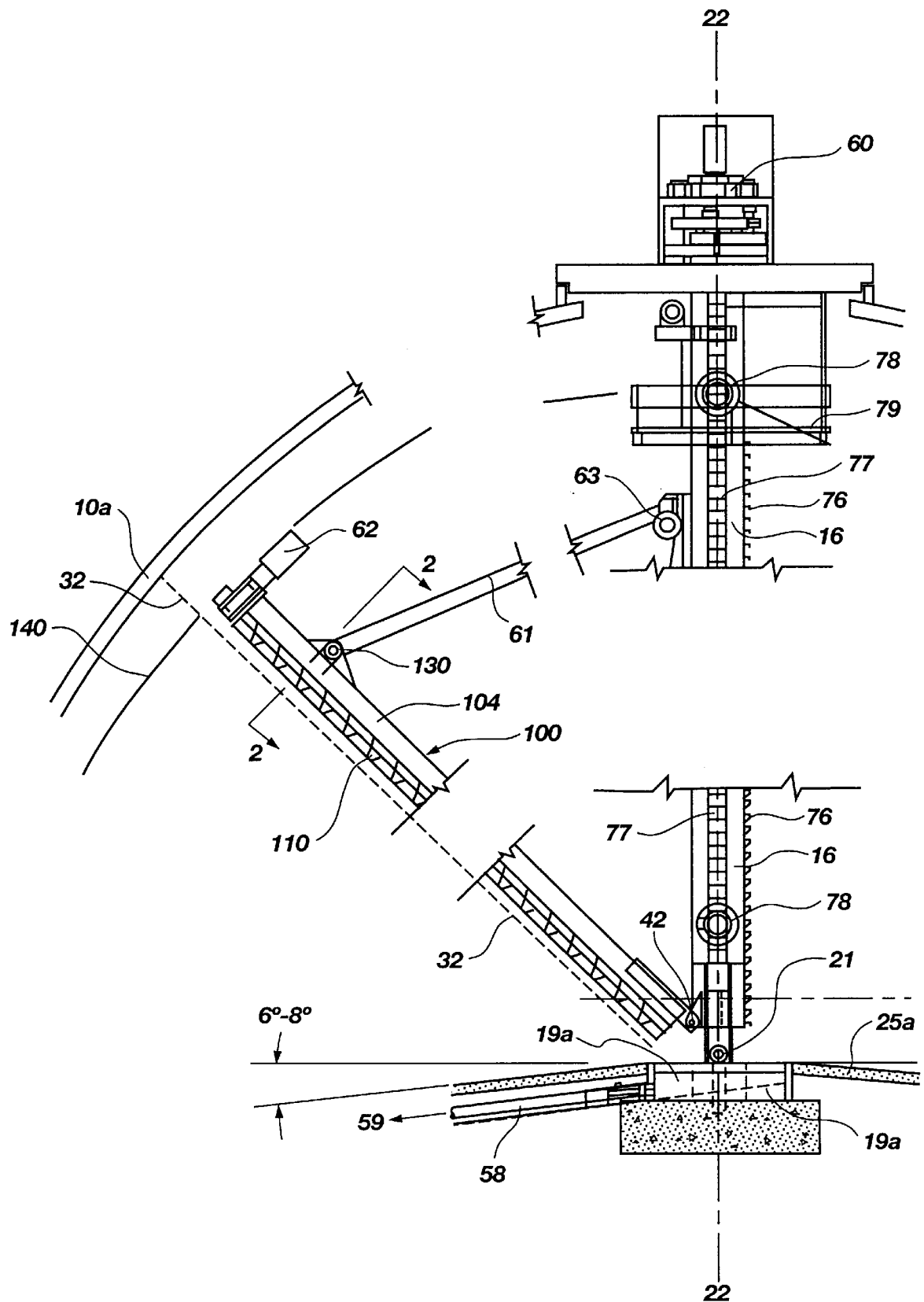
FIG. 3 shows an elevation view of an elongate material transfer structure incorporating the crescent shaped support cover of the present invention within a greater-than-hemispherical dome storage structure.

Referring now to the drawings:

FIG. 1 provides a medial cross section of a prior art hemispherical dome storage structure 10 showing typical transfer bridge structures 40 and 41. Such domed storage structures may also be greater than hemispherical as shown in FIG. 3, having a floor 25a that slopes downward and away from the center of the dome 10a allowing greater storage capacity for a dome of a given radius. A typical slope for such floors is 6° to 8°, which provides a seven or eight percent greater internal storage volume, among other advantages. These reclaimers typically comprise a rotating vertical column 16 in the center of the dome 10, with one or more elongate material transfer support frames 40 and 41 attached to the bottom of the column via a hinge 42, and connected to the top of the column via a cable 61 and winch device 63. Auger mechanisms 17 and 18 are attached to the support frames, with a column rotation motor 60 mounted on top of the column 16, and auger drive motors 62 attached to the distal ends of the transfer structures. The cable 61 and winch device 63 allows the transfer support structures and auger mechanisms to be selectively raised or lowered to any angle of declination, shown for example at 54 and 55, so as to contact the surface of the stored material 11. It will be appreciated that the transfer support frames and auger mechanisms are necessarily of a length less than the radius of the dome 10 so as not to contact the inside surface of it at any angle of declination.

In the prior art storage and reclamation facilities, the column 16 has a rotatable base 21 which allows the column 16 and all appurtenant structure to be rotated about the column's vertical axis 22. Directly beneath the column 16 is a material receptor opening 19 leading to a chute 24 which allows granular material to drop onto a conveyor belt system 82 in a tunnel 80 beneath the dome floor 25, which extends beyond the perimeter of the enclosure to some desired location for transfer of the granular materials. Alternatively, as shown in FIG. 3, the material receptor opening may be an annular opening 19a formed around the column base 21, communicating with an "air slide" conveyor system 58 installed beneath the concrete floor 25a to transport the materials beyond the perimeter of the enclosure in the direction of arrow 59. Other means known in the art for conveying granular or powdered material may also be employed. The column 16 also includes an exterior access ladder 76, an interior access ladder 77, access hatches 78, and an observation platform 79 for maintenance worker access, etc. in the interior of the dome 10a. "Air slide" conveyors are well known in the art, and operate by aerating the granular material by means of air jets, allowing it to freely flow or slide downhill under the force of gravity toward an outlet. As shown in FIG. 3, a 6° to 8° slope is ideal to assist dry powdered cement in its motion.

When in use, the domed storage structure is typically filled via a conveyor 12 or similar transport mechanism that drops material into the dome through an opening 13 in the top of the structure. Upon filling, the center column and transfer mechanism are buried up to some level 15 in the stored material with the elongate transfer bridges 40 and 41 retracted to an upright position as shown by the solid lines in FIG. 1. When material is to be reclaimed, first a sufficient quantity of material is removed from the bottom center of the dome, into the chute and conveyor means, by some means such as air injection, which allows a generally conical volume of material in the center of the dome to collapse from the bottom up, and fall into the opening 19 by operation of gravity, leaving a material surface 32. Once a volume of material has been removed from the center of the enclosure, and the remaining material in the dome forms a conical slope pointing toward the base of the column at some angle of repose such that gravity alone will no longer be sufficient to move the material toward the outlet, the transport auger mechanisms are then engaged to drag the material along the slope 32 toward the outlet 19. The transfer bridge structures are lowered to the material surface 32 with the augers 17 and 18 rotating, and as the center column 16 slowly rotates about its vertical axis 22, the augers sweep around the surface of the material in a gradually declining conical motion, and drag the stored material toward the outlet 19 at the base of the column 21.

Figure 2:
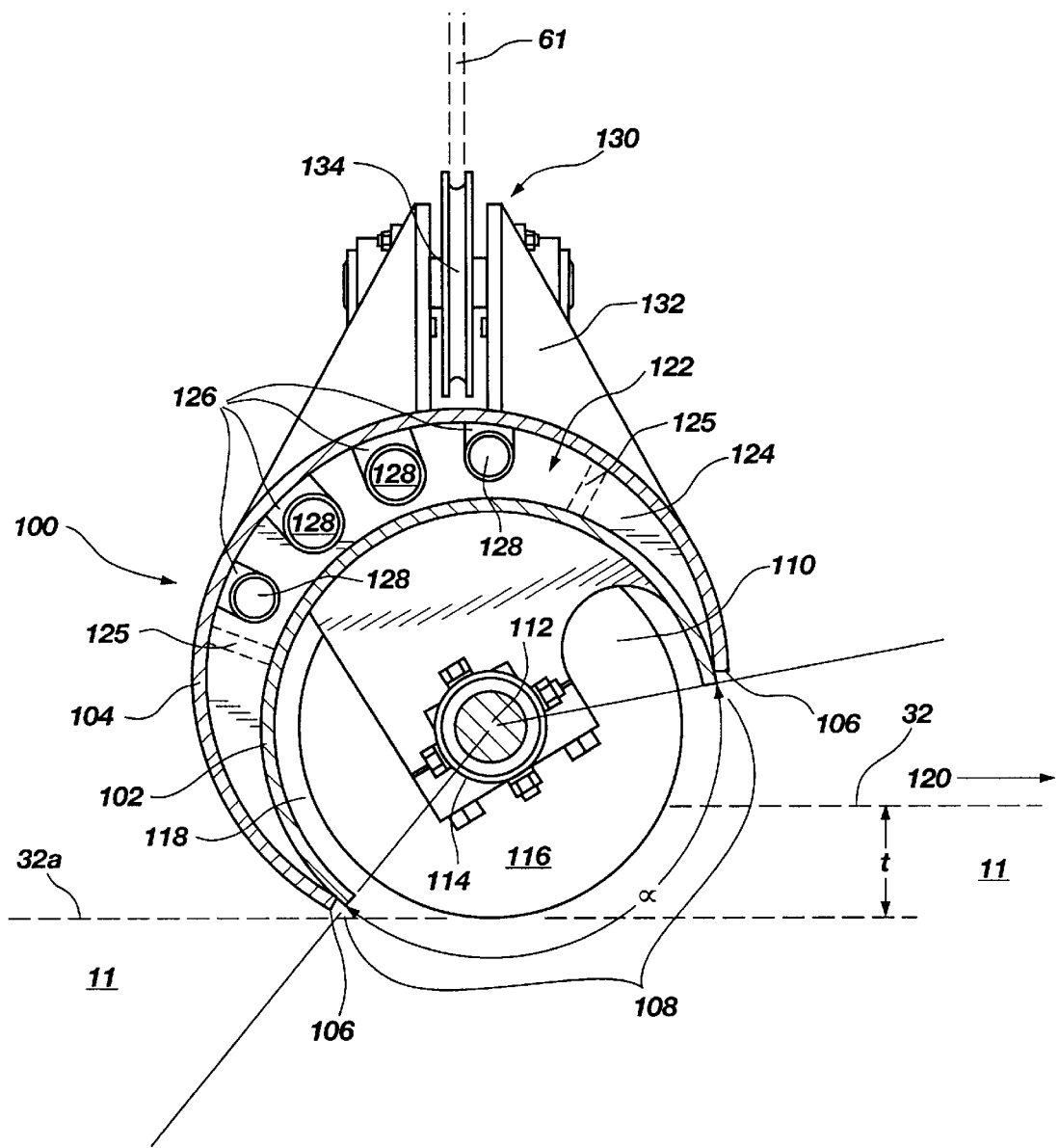
FIG. 2 shows a cross-sectional view of the crescent shaped support cover of the present invention.

FIG. 2 shows a cross-sectional view of the crescent shaped support cover denoted generally at 100. As shown in FIG. 3, this view is taken at near the distal end of the transfer structure through the cable sheave connection assembly 130 at section A—A. The support cover 100 is comprised of a first tube 102 which is contained within and attached to a second larger tube 104 along the edges 106 of an opening 108 formed in both tubes. Within the partially open tubular space inside the first tube 102 is an auger device 110 having a center shaft 112 rotatably connected to the first tube 102 such as by bearings 114. The auger has spiral flights 116 that are designed to engage and drag the granular or powdered material along the length of the transfer structure. The tubes are preferably made of steel or some other strong metal, and are preferably connected by means of welding along the edges 106 of the opening.

In FIG. 2 the tubes 102 and 104 are depicted as circular in cross-section. This configuration is preferred because the transfer structure thus has a smooth outer surface which will not provide a flat surface for settling of granular or powdered material in any orientation—whether nearly vertical or fully horizontally declined. However, it will be apparent that the tubes need not be circular, but may have other cross-sectional shapes, such as square, hexagonal, octagonal, etc. Similarly, the first tube need not have the same cross-sectional shape as the second tube. A circular tube is preferred for the first tube because when oriented concentrically with the auger it will provide a uniform gap 118 between the auger blades 116 and the inside surface of the auger cover. This gap may be sized to provide optimal contact between the auger flights 116 and the granular or powdered material 11 so as to reduce spillage of the material around the flights for optimal movement of the material. It will be appreciated that a larger gap will allow greater spillage, whereas a gap that is too small may produce excessive friction with the granular material and the possibility of jamming the auger if some large chunks of granular material or foreign objects get caught in the apparatus.

The opening 108 in the side of the tube covers an arc α which may be any suitable size, depending on the amount of material to be removed in a single pass. Naturally, the amount of material that may be removed in a single pass will depend upon the diameter of the auger 110 and the power output and drive rate of the auger drive system 62. The opening 108 will typically comprise an angle of from approximately 90° to 180° of the arc of the first (inside) tube 102. It will be appreciated that a larger opening, such as more than 180°, will tend to provide less positive containment of the granular or powdered material, and will expose a greater area of the auger blades to settling granular or powdered material when the transfer structure is in the upright position, thus imposing greater loads on the transfer structure and center column. At the same time, a small opening, such as less than 90°, will tend to more effectively shield the auger flights when the transfer structure is upright, but will also constrict the material feed rate. In FIG. 2 the opening 108 is shown as occupying an arc a of about 135° which is presently preferred for a 30" diameter auger system in a powdered cement storage facility.

When the transfer structure 100 passes over the surface 32 of the stored material, the auger 110 grabs and pushes some thickness t of the material along its length, reducing the relative elevation of the surface to that designated 32a. As shown, the support cover 100 is oriented so as to have its bottom extremity at the surface 32a of the granular or powdered material after the mechanism has passed over. As will be appreciated, this surface 32a is generally tangent to the bottom of the auger blades relative to the direction of travel 120 of the transfer structure 100.

In one embodiment of the present invention, transverse crescent shaped stiffeners 124 are located within the crescent shaped space 122 between the outside surface of the first tube 102 and the inside surface of the second tube 104. These stiffeners are preferably pieces of plate steel cut to the proper shape, and welded along their perimeter to both tubes. Those skilled in the art will be able to determine the optimal longitudinal spacing of stiffeners along the length of the support cover to give sufficient structural rigidity to the support cover, both as to longitudinal bending and axial torsion, depending on the weight of the auger drive mechanism 62 and appurtenant structures, the total length of the support cover 100, and the thickness of the first tube 102 and the second tube 104. Alternatively, stiffeners of other configurations, such as longitudinal plates 125 bridging the gap between the outside of the first tube and the inside of the second tube, may also be advantageously employed alone or in combination with the transverse stiffeners 124 to accomplish the same end. It will also be apparent to one skilled in the art that known algorithms for structural design may be used to optimize the orientation, thickness, and spacing of these stiffeners for the required level of torsional and bending strength depending on the size and application of the transfer structure.

In one embodiment, the transverse stiffeners 124 include one or more openings 126 for utility conduits 128 such as electrical lines, hydraulic lines, communication lines, etc. These lines may be for providing power and control of the auger drive motors 62 and other equipment located at the distal end of the transfer structure 100. The proximal ends of these utility lines will be attached to or extend into the interior of the column 16 near the hinge 42 so as to be protected from stress due to motion of the transfer structure and from loads imposed by the stored material.

FIG. 2 also includes an end view of a cable sheave assembly denoted generally at 130 connected to the outside surface of the second tube 104. The cable sheave assembly 130 is preferably welded to the first tube with stiffeners 132 and includes a pulley 134 designed to accommodate the cable 61 for control of the angle of declination of the transfer structure. The other end of the cable 61 is typically connected to the winch device 63 located at the top of the column 16, as shown in FIG. 3. It will be appreciated that the cable sheave 130 depicted is just one means of connecting the cable 61 to the distal end of the transfer structure, and other means may be devised that are consistent with the present invention.

FIG. 3 shows a broken section elevation view of an elongate material transfer structure incorporating the crescent shaped support cover 100 of the present invention within a greater-than-hemispherical dome storage structure 10a. In addition to the above description, this view more plainly shows the compact shape and smooth outside surface of the outer tube 104 of the transfer structure 100. This view also shows the typical location of connection of the cable sheave connector 130 to the outside of the transfer structure 100 nears its distal end. Also shown is the arc line 140 representing the swept path of the transfer structure as it is raised or lowered in a manner similar to the prior art transfer structure depicted in FIG. 1.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A support cover for an elongate material reclamation mechanism in a granular or powdered material storage enclosure, said support cover comprising:

a first elongate tube having an outside surface, an inside surface, a longitudinal axis, and having a longitudinal opening formed between said outside surface and said inside surface along the full length of said tube, said longitudinal opening having a width measured between two opposing longitudinal edges;

a second elongate tube having an inside surface, an outside surface, a longitudinal axis, and having a longitudinal opening formed between said outside surface and said inside surface along the full length of said tube, said longitudinal opening having a width measured between two opposing longitudinal edges, said width being approximately equal to the width of the longitudinal opening in the first tube, and said second tube being larger in cross-section than said first tube, such that said first tube may be longitudinally contained within said second tube with the longitudinal axis of the first tube parallel to and offset from the longitudinal axis of the second tube such that the longitudinal openings of the first tube and the second tube are aligned along said opposing longitudinal edges, said first tube being continuously attached to said second tube along the opposing edges of the longitudinal openings, forming an elongate structure defining a partially open elongate tubular space within the first tube suitable for partially enclosing an elongate auger, and defining an enclosed cross-sectionally substantially crescent shaped space between the outside surface of the first tube and the inside surface of the second tube, said elongate structure configured to function as both an auger cover and a load-bearing structural support member for an elongate material reclamation mechanism.

2. The apparatus as described in claim 1 wherein the width of the longitudinal opening in the first tube defines an arcuate portion of the cross-section of said first tube of from 90° to 180°.

3. The apparatus as described in claim 2 wherein the first tube and the second tube are attached by means of welding along the longitudinal edges of the longitudinal openings.

4. The apparatus as described in claim 3 further comprising at least one utility conduit disposed in the substantially crescent shaped enclosed space between the outside surface of the first tube and the inside surface of the second tube, said at least one conduit configured to carry electrical cables, hydraulic tubing, communication lines, and the like.

5. The apparatus as described in claim 4 wherein at least one transverse structural support member is disposed in the substantially crescent shaped enclosed space between the outside surface of the first tube and the inside surface of the second tube, said structural support member being integrally fastened to the outside surface of said first tube and to the inside surface of said second tube.

6. The apparatus as described in claim 5 wherein said first tube and said second tube are made of steel and have a circular cross section.

7. The apparatus as described in claim 6 wherein said support cover has a proximal end and a distal end, said enclosure has a floor, and further comprising:

an elongate auger having a longitudinal axis, said auger being concentrically and rotatably disposed within the first tube and extending from the proximal end to the distal end of the support cover;

a support column having a base, a top, and a vertical axis;

material receptor means located at the base of the support column for receiving the granular or powdered material;

auger drive means disposed at the distal end of the support cover and configured to rotationally drive the auger about its longitudinal axis so as to drag the granular or powdered material toward the material receptor means at the base of the column;

a hinged connection between the proximal end of the support cover and the base of the support column; and cable connection means connected to the distal end of the support cover and the top of the support column, whereby the support cover and elongate material reclamation mechanism may be selectively declined about the hinged connection at the base of the column from a substantially vertical orientation nearly parallel to the column, to an orientation substantially parallel to and in contact with the floor of said enclosure such that the auger may be brought into contact with the surface of the stored granular or powdered material.

8. The apparatus as described in claim 7 wherein:

said enclosure comprises a dome structure;

said support column is enclosed within and located at the geometric center of the dome structure, and is rotatable about its vertical axis; and the longitudinal opening in the first tube is oriented to downwardly face the direction of rotation of the support column, thereby exposing auger blades to the surface of the granular or powdered material in a rotational, conical path when the column is rotated about its vertical axis and the auger operates, so as to remove successive conical layers of the granular or powdered material.

9. The apparatus as described in claim 8 wherein the floor of the enclosure is inclined at an angle of from 6° to 8° downward and away from its center.

10. The apparatus as described in claim 8, further comprising conveyor means connected to the material receptor means, whereby the granular or powdered material may be conveyed from within the enclosure to a desired point outside the enclosure.

11. A support cover for an elongate material reclamation mechanism in a domed granular or powdered material storage enclosure having a floor, a support column enclosed within and located at the geometric center of the storage enclosure and having a base, a top, and a vertical axis, said column being rotatable about its vertical axis, and material receptor means located at the base of the support column for receiving the granular or powdered material, said support cover comprising:

a first elongate tube having an outside surface, an inside surface, a longitudinal axis, a proximal end and a distal end, and having a longitudinal opening formed between said outside surface and said inside surface from the proximal end to the distal end of said tube, said longitudinal opening having a width measured between two opposing longitudinal edges;

a second elongate tube having an inside surface, an outside surface, a longitudinal axis, a proximal end and a distal end, and having a longitudinal opening formed between said outside surface and said inside surface from the proximal end to the distal end of said second tube, said longitudinal opening having a width measured between two opposing longitudinal edges, said width being approximately equal to the width of the longitudinal opening in the first tube, and said second tube being larger in cross-section than said first tube, such that said first tube may be longitudinally contained within said second tube with the longitudinal axis of the first tube parallel to and offset from the longitudinal axis of the second tube such that the longitudinal openings of the first tube and the second tube are aligned along said opposing longitudinal edges, said first tube being continuously attached to said second tube along the opposing edges of the longitudinal openings, forming an elongate structure defining a partially open elongate tubular space within the first tube, and defining an enclosed cross-sectionally substantially crescent shaped space between the outside surface of the first tube and the inside surface of the second tube, said elongate structure configured to function as both an auger cover and a load-bearing structural support member for the elongate material reclamation mechanism;

an elongate auger concentrically rotatably disposed within the tubular space within said first tube and having a longitudinal axis, and extending from the proximal end to the distal end thereof;

auger drive means disposed at a distal end of the support cover and configured to rotationally drive the auger about its longitudinal axis so as to drag the granular or powdered material toward the material receptor means at the base of the column;

a hinged connection between a proximal end of the support cover and the base of the support column; and cable connection means connected to the distal end of the support cover and the top of the support column, whereby the support cover and elongate material reclamation mechanism may be selectively declined about the hinged connection at the base of the column from a substantially vertical orientation nearly parallel to the column, to an orientation substantially parallel to and in contact with the floor of said enclosure such that the auger may be brought into contact with the surface of the stored granular or powdered material, the longitudinal opening in the first tube being oriented to downwardly face the direction of rotation of the column, thereby exposing auger blades to the surface of the granular or powdered material in a rotational, conical path when the column is caused to rotate about its vertical axis and the auger operates, so as to remove successive conical layers of the granular or powdered material.

12. The apparatus as described in claim 11, wherein the width of the longitudinal opening in the first tube defines an arcuate portion of the cross-section of said first tube of from 90° to 180°.

13. The invention as described in claim 11 wherein the first tube and the second tube are attached by means of welding along the longitudinal edges of the longitudinal openings.

14. The invention as described in claim 11 further comprising at least one utility conduit disposed in the substantially crescent shaped enclosed space between the outside surface of the first tube and the inside surface of the second tube, said at least one conduit configured to carry electrical cables, hydraulic tubing, communication lines, and the like.

15. The invention as described in claim 11 wherein at least one transverse structural support member is disposed in the substantially crescent shaped enclosed space between the outside surface of the first tube and the inside surface of the second tube, said structural support member being integrally fastened to the outside surface of said first tube and to the inside surface of said second tube.

16. The invention as described in claim 11 wherein said first tube and said second tube are made of steel and have a circular cross section.

17. The invention as described in claim 11 wherein the floor of the enclosure is inclined at an angle of from 6° to 8° downward and away from its center, and further comprising conveyor means connected to the material receptor means, whereby the granular or powdered material may be conveyed from within the enclosure to a desired point outside the enclosure.

* * * * *